(12) United States Patent
Hirai et al.

(10) Patent No.: US 6,484,249 B2
(45) Date of Patent: Nov. 19, 2002

(54) APPARATUS AND METHOD FOR TRANSFERRING DATA BETWEEN ADDRESS SPACES WITH DIFFERENT SEGMENT LENGTHS

(75) Inventors: Koichi Hirai, Kawasaki (JP); Toshihiko Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 186 days.

(21) Appl. No.: 09/731,992

(22) Filed: Dec. 7, 2000

(65) Prior Publication Data

US 2001/0025336 A1 Sep. 27, 2001

(30) Foreign Application Priority Data

Feb. 29, 2000 (JP) .......................................... 2000-057914

(51) Int. Cl.[7] .............................................. G06F 12/00
(52) U.S. Cl. ....................... 711/209; 711/202; 711/206; 711/208; 711/212
(58) Field of Search .......................... 711/209, 200–208, 711/212, 221

(56) References Cited

U.S. PATENT DOCUMENTS 4,835,734 A * 5/1989 Kodaira et al. ............. 711/209
5,649,142 A    7/1997 Lavelle et al. ............. 771/209
5,802,605 A * 9/1998 Alpert et al. ............... 711/208

FOREIGN PATENT DOCUMENTS

| EP | 603 994 | 6/1994 |
|----|---------|--------|
| GB | 1 428 503 | 3/1976 |
| GB | 2 008 822 | 6/1979 |

* cited by examiner

Primary Examiner—Do Hyun Yoo
Assistant Examiner—Nasser Moazzami
(74) Attorney, Agent, or Firm—Greer, Burns & Crain, Ltd (57) ABSTRACT

An apparatus and method for efficiently transferring a plurality of segmented data with various sizes. An address translation storage unit stores an address translation table which provides a plurality of translation descriptor domains to support a plurality of translation step sizes. Depending on the segment size of each data block to be transferred, a translation descriptor domain selection unit chooses a suitable translation descriptor domain within the address translation table. Data segment mapping is then performed with translation descriptors in the selected translation descriptor domain.

5 Claims, 11 Drawing Sheets

APPARATUS AND METHOD FOR TRANSFERRING DATA BETWEEN ADDRESS SPACES WITH DIFFERENT SEGMENT LENGTHS

BACKGROUND OF THE INVENTION

1. Field of the Invention

The present invention relates to an apparatus and method for transferring data between address spaces having different structures, as well as to a computer-readable medium storing a computer program therefor. More particularly, the present invention relates to an apparatus and method for transferring data in such an environment where the source and destination address spaces are organized by a plurality of various-sized segments. The invention also relates to a computer-readable medium storing a data transfer program which causes a computer to function as the above apparatus.

2. Description of the Related Art

When transferring data between differently structured address spaces (e.g., computer main memory, input and output channels, external mass storage), it is necessary to properly associate a given source area with its corresponding destination area. To this end, computer systems generally use an address translation table to map one address space to another.

Figure 11:
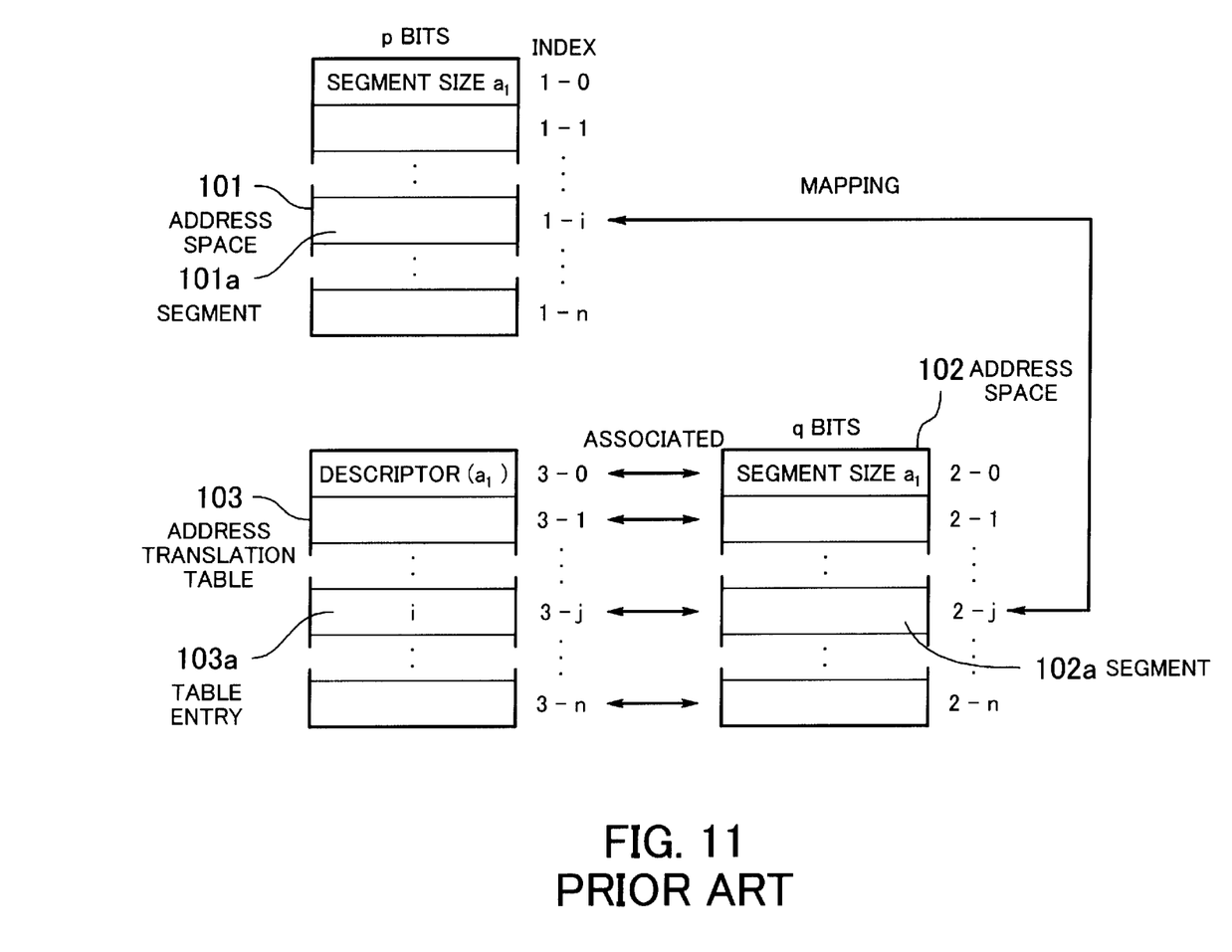
FIG. 11 is a diagram which shows a conventional way of how one address space is mapped to another address space with a different data structure.

FIG. 11 illustrates a conventional address mapping method. In this example, an address translation table 103 describes how to associate a p-bit wide address space 101 with a q-bit wide address space 102. The two address spaces 101 and 102 are each divided into a plurality of segments with a size of $a_1$. These segments constituting the address spaces 101 and 102 are designated by their respective index numbers "1-0" to "1-n" and "2-0" to "2-n." The address translation table 103 contains a plurality of table entries 103a, which describe how to translate addresses within each segment of the size $a_1$. These table entries have their index numbers "3-0" to "3-n," similarly to the address spaces 101 and 102.

Each entry of the address translation table 103 is associated with a particular segment of the address space 102, permitting a given segment in the address space 101 to be mapped to its corresponding part of the address space 102. Take the table entry 103a of index "3-j," for example. Besides storing the index value i of the segment 101a, this table entry 103a is associated with a segment 102a of index "2-j" in the address space 102. This setup of the table entry 103a enables the segments 101a to be mapped to the segment 102a.

The conventional address mapping method is, however, not efficient enough because of its lack of flexibility in handling uneven segment sizes. As previously stated, the conventional method only supports a single segment type. Although the data to be transferred may actually include some blocks that are larger than others, the conventional method cannot handle them as a bulk segment, because the step size of address translation is not allowed to exceed the greatest common divisor of such different block sizes.

Suppose, for example, that the source address space has two portions with different segment sizes $a_1$ and $(a_1 x s)$, where s is an integer, and data is to be transferred from these two portions to another address space. In this situation, the translation step size of the address translation table must be chosen from among the common divisors of $a_1$ and $(a_1 x s)$. That is, the translation step size cannot exceed $a_1$, the greatest common divisor of the two segment sizes. Since a mapping occurs at every segment of the size $a_1$, the related hardware and software mechanisms are triggered s times as frequently as in the case where the segment size is $(a_1 x s)$, being unable to enjoying the advantage of the large source data blocks.

SUMMARY OF THE INVENTION

Taking the above into consideration, an object of the present invention is to provide an apparatus which efficiently transfers a plurality of data segments with different sizes.

It is another object of the present invention to provide a method which efficiently transfers a plurality of data segments with different sizes.

To accomplish the first object, according to the present invention, there is provided a data transfer apparatus which transfers data from a first address space to a second address space, where the first and second address spaces are different in data structure. This data transfer apparatus comprises the following elements: an address translation table storage unit, a base address register, a boundary location register, a translation step size register, a translation descriptor domain selector, and a data segment association unit.

The address translation table storage unit stores an address translation table which is organized by a plurality of translation descriptor domains to support a plurality of translation step sizes. The base address register stores base addresses of a plurality of portions of the second address space which are corresponding to the plurality of translation descriptor domains. The boundary location register stores the boundary location of each translation descriptor domain. The translation step size register stores the translation step size that is supported in each translation descriptor domain. The translation descriptor domain selector selects one of the translation descriptor domains that is suitable for mapping a given data segment in the first address space. The data segment association unit associates that data segment in the first address space with another data segment in the second address space, according to the translation step size supported in the translation descriptor domain selected by the translation descriptor domain selector.

To accomplish the second object, according to the present invention, there is provided a method of transferring data from a first address space to a second address space, where the first and second address spaces are different in data structure. This method comprising the following steps: (a) storing an address translation table which is organized by a plurality of translation descriptor domains to support a plurality of translation step sizes; (b) storing base addresses of a plurality of portions of the second address space which are corresponding to the plurality of translation descriptor domains; (c) storing boundary locations of the plurality of translation descriptor domains; (d) storing translation step sizes that are respectively supported in the plurality of translation descriptor domains; (e) selecting one of the translation descriptor domains that is suitable for mapping a data segment in the first address space; and (f) associating the data segment in the first address space with another data segment in the second address space, according to the translation step size supported in the selected translation descriptor domain.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
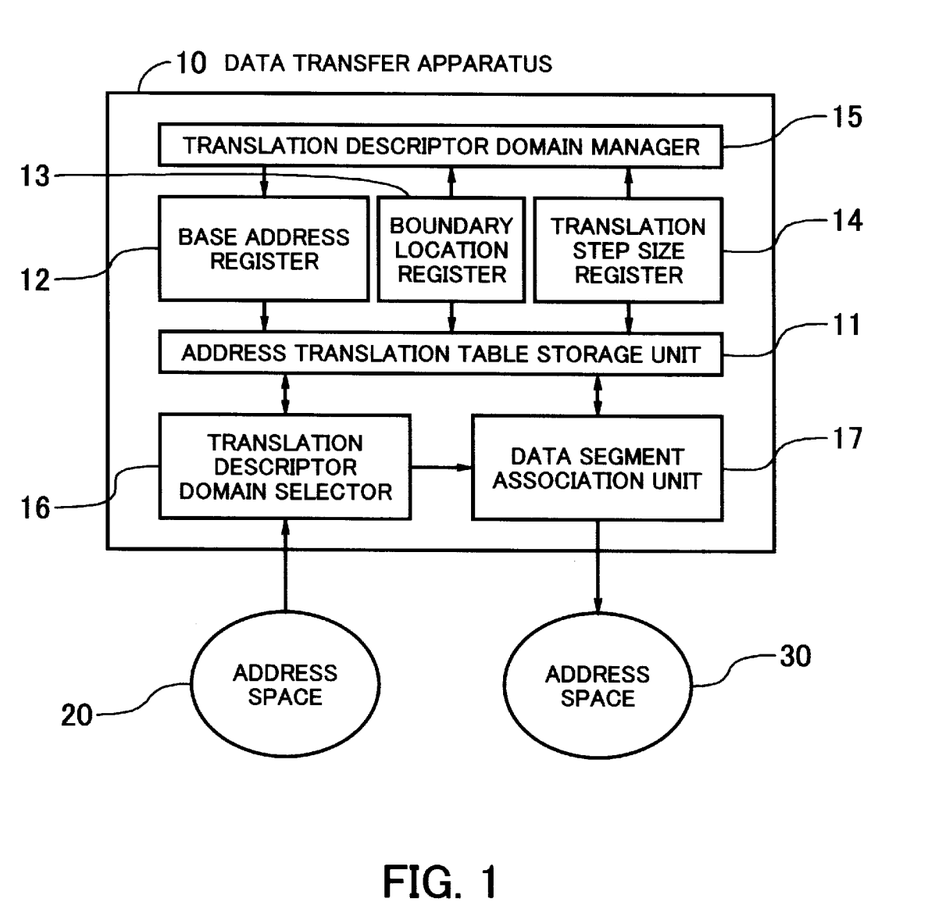
FIG. 1 is a block diagram of a data transfer apparatus according to the present invention.

FIG. 1 is a block diagram of a data transfer apparatus 10 according to the present invention. This data transfer apparatus 10 transfers data from a first address space 20 to a second address space 30. The proposed apparatus 10 comprises the following elements: an address translation table storage unit 11, a base address register 12, a boundary location register 13, a translation step size register 14, a translation descriptor domain manager 15, a translation descriptor domain selector 16, and a data segment association unit 17.

The address translation table storage unit 11 stores an address translation table which is organized by a plurality of translation descriptor domains to support a plurality of translation step sizes. The base address register 12 stores the base address of each portion of the second address space 30 which is corresponding to a translation descriptor domain. The boundary location register 13 stores the boundary location of each translation descriptor domain. The translation step size register 14 stores the translation step size that each translation descriptor domain supports. The translation descriptor domain manager 15 manages the translation descriptor domains. The translation descriptor domain selector 16 selects a specific translation descriptor domain that is suitable for mapping a given data segment in the first address space. The data segment association unit 17 associates each data segment in the first address space with its corresponding one in the second address space, according to the translation step size supported in the translation descriptor domain selected by the translation descriptor domain selector 16.

Figure 2:
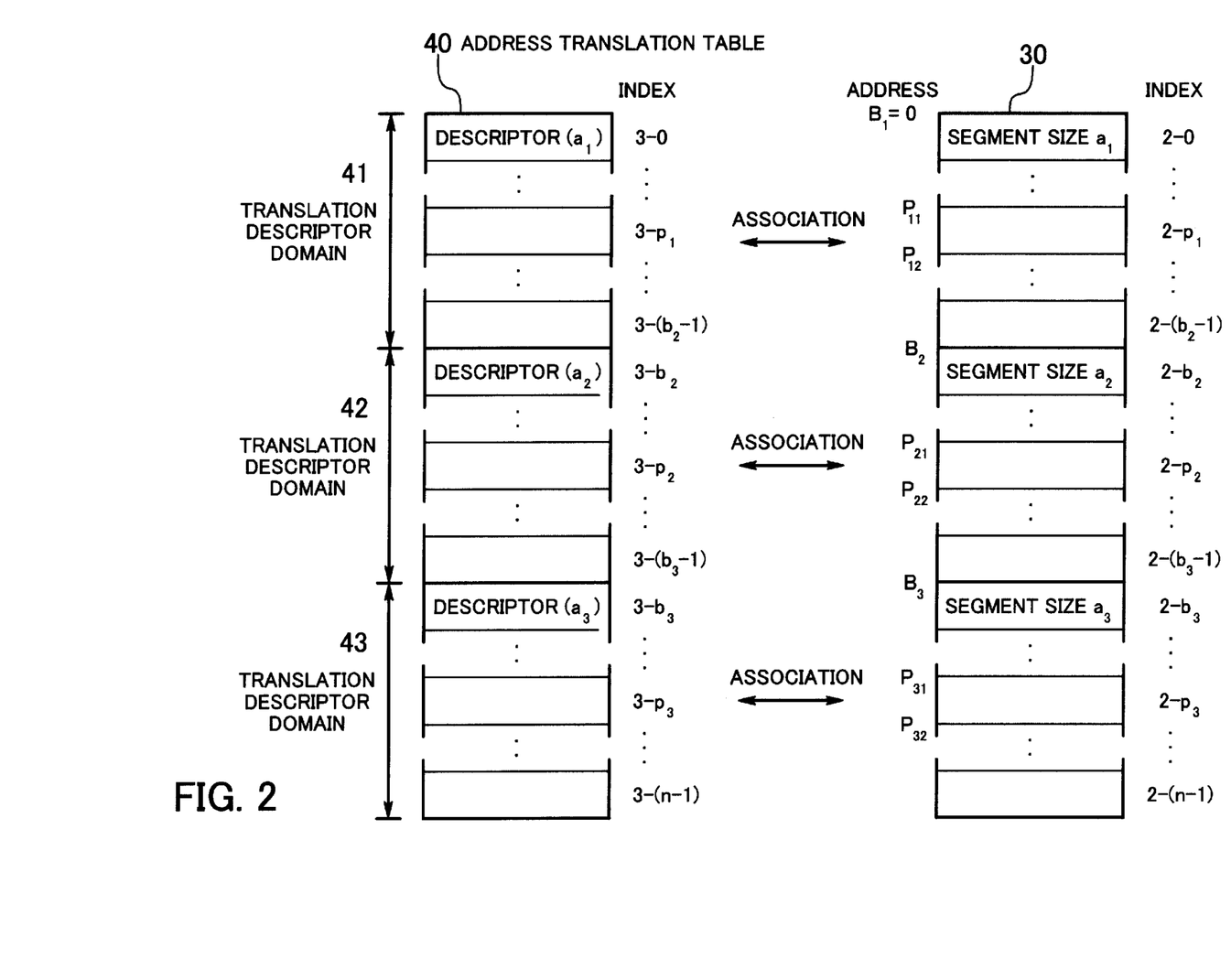
FIG. 2 is a diagram which illustrates the structure of an address translation table and its associated address space.

FIG. 2 shows the structure of an address translation table 40 stored in the address translation table storage unit 11, together with the structure of its associated address space 30. This address translation table 40 contains a plurality of entries, each of which provides the index number of a certain data segment of the first address space that is associated with that entry (discussed later). Such table entries are referred to herein as "translation descriptors" since they describe how the address of a given data segment should be translated.

In the example of FIG. 2, the address translation table 40 divides into three separate domains 41, 42, and 43, depending on the translation step size to be applied therein. They are referred to herein as the "translation descriptor domains." Translation descriptors in each such domain 41, 42, and 43 are uniformly defined with a particular translation step size. More specifically, the descriptors in the first translation descriptor domain 41 are of a translation step size $a_1$, while those in the second translation descriptor domain 42 are of a different translation step size $a_2$. The descriptors in the third translation descriptor domain 43 are of still another translation step size $a_3$. These three step sizes $a_1$, $a_2$, and $a_3$ are directly associated with the data segment sizes $a_1$, $a_2$, and $a_3$ in the address space 30, from which the data is to be transferred. That is, the address translation table 40 in the present example supports three different data types. The translation descriptors are consecutively numbered throughout the three translation descriptor domains 41, 42, and 43. These serial numbers, ranging from 3-0 to 3-(n-1), are referred to as the index numbers, which are used to retrieve a particular entry (i.e., translation descriptor) from the address translation table 40.

Referring to FIG. 2, the translation descriptors with indexes 3-0 to 3-(n-1) are directly associated with the n segments of the address space 30, which are numbered sequentially from 2-0 to 2-(n-1). Note again that the size of each specific segment of the address space 30 is the same as the translation step size of its corresponding translation descriptor. Take a translation descriptor belonging to the first translation descriptor domain 41, for example. The translation step size $a_1$ of this descriptor is equal to the size $a_1$ of its associated segment in the address space 30. Likewise, the translation step size $a_2$ applied in the second translation descriptor domain 42 is equal to the size $a_2$ of the corresponding address space segments.

Table 1 shown below gives the relationship between the translation step size and other two register values. They are the boundary location and base address, which characterize each of the translation descriptor domains 41, 42, and 43 (represented as #1, #2, #3, respectively). The boundary location register stores the index value of the top descriptor of each translation descriptor domain, indicating where the address translation table 40 are divided. Specifically, the boundary of the first translation descriptor domain 41 is located at index zero, and that of the second translation descriptor domain 42 lies at index $b_2$. The base address register, on the other hand, stores a specific address value, rather than index information. That is, when a specific translation descriptor domain is given, its base address register provides the corresponding top address in the address space 30, relative to the beginning of that space.

TABLE 1

| Translation Descriptor domain | | #1 | #2 | #3 |
|---|---|---|---|---|
| Registers: | Translation Step Size | $a_1$ | $a_2$ | $a_3$ |
| | Boundary location | $b_1$ | $b_2$ | $b_3$ |
| | Base address | $B_1$ | $B_2$ | $B_3$ |

Note: $b_1 = 0$, $B_1 = 0$

When the nine parameters listed in Table 1 are given in their respective registers, the general formulas to yield segment addresses $P_{11}$, $P_{12}$, $P_{21}$, $P_{22}$, $P_{31}$, and $P_{32}$ are as follows:

$$\left.\begin{aligned}
B_1 &= 0 \\
P_{11} &= a_1 \times p_1 \\
P_{12} &= a_1 \times (p_1 + 1) \\
B_2 &= a_1 \times b_2 \\
P_{21} &= a_2 \times (p_2 - b_2) + B_2 \\
P_{22} &= a_2 \times (p_2 + 1 - b_2) + B_2 \\
B_3 &= a_2 \times (b_3 - b_2) + B_2 \\
P_{31} &= a_3 \times (p_3 - b_3) + B_3 \\
P_{32} &= a_3 \times (p_3 + 1 - b_3) + B_3
\end{aligned}\right\} \quad (1)$$

where $P_{11}$ and $P_{12}$ represent the beginning and end addresses of a segment 2-$p_1$; $P_{21}$ and $P_{22}$ represent the beginning and end addresses of a segment 2-$p_2$; and $P_{31}$ and $P_{32}$ represent the beginning and end addresses of a segment 2-$p_3$.

Figure 3:
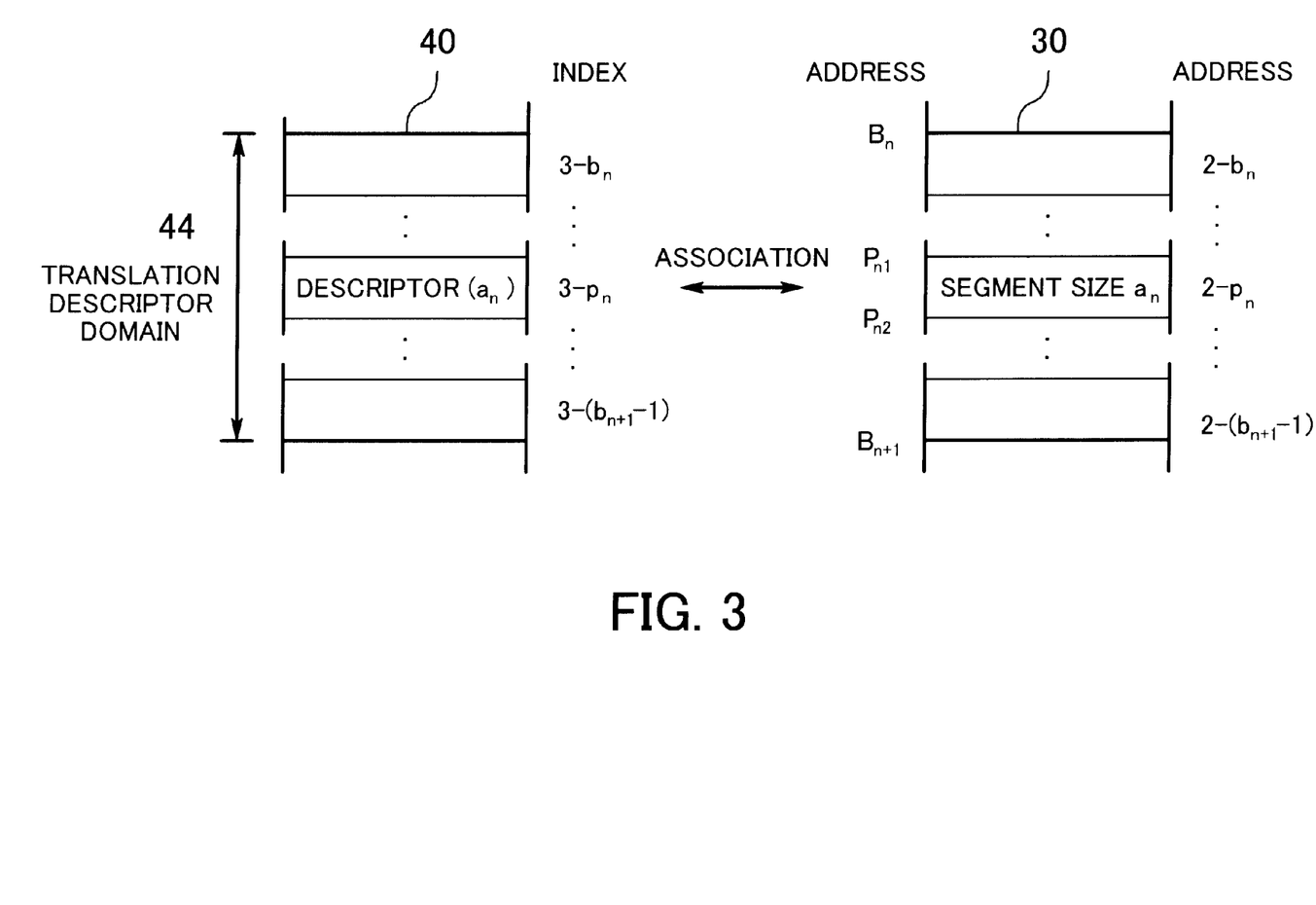
FIG. 3 is a diagram which shows the general structure of the address translation table and its associated address space.

FIG. 3 depicts the general structure of an address translation table 40 and its associated address space 30. Table 2 shows the relationships among the translation step size, boundary location, and base address in a translation descriptor domain 44. As seen from FIG. 3 and Table 2, the nth translation descriptor domain 44 is characterized by the following three parameters: translation step size $a_n$, boundary location $b_n$, and base address $B_n$. Each translation descriptor is associated with a segment with a size of $a_n$ in the address space 30.

TABLE 2

| Translation Descriptor domain | | #n |
|---|---|---|
| Registers: | Segment type | $a_n$ |
| | Boundary location | $b_n$ |
| | Base address | $B_n$ |

Note: $b_1 = 0$, $B_1 = 0$

The general relationship between the translation step size $a_n$ and boundary location $b_n$ will be formulated as follows. First, the following equations should be considered.

$$\left.\begin{aligned}
a_{n-1} \times c'_n &= a_n \times c_n = d_n \\
a_{n-2} \times c'_{n-1} &= a_{n-1} \times c_{n-1} = d_{n-1}
\end{aligned}\right\} \quad (2)$$

where $c_n$ and $c_n'$ are integers, and $d_n$ is a common multiple of $a_{n-1}$ and $a_n$. Using $c_n$, $c_{n-1}$, $c_n'$, and $c_{n-1}'$ in the equations (2), the boundary location $b_n$ can be expressed as follows.

$$\left.\begin{aligned}
b_1 &= 0 \\
b_2 &= c'_2 \\
b_n &= c'_n + b_{n-1} - c_{n-1}
\end{aligned}\right\} \quad (3)$$

Then the following formulas will give the base address $B_n$ and the beginning address $P_{n1}$ and end address $P_{n2}$ of a segment 2-$p_n$.

$$\left.\begin{aligned}
B_n &= \sum_{i=1}^{n} a_{i-1} \times (b_i - b_{i-1}) \\
&= a_{n-1} \times (b_n - b_{n-1}) + B_{n-1} \\
P_{n1} &= a_n \times (p_n - b_n) + \sum_{i=1}^{n-1} a_i \times (p_i - b_i) \\
&= a_n \times (p_n - b_n) + B_{n-1} \\
P_{n2} &= a_n \times (p_n + 1 - b_n) + \sum_{i=1}^{n-1} a_i \times (p_i - b_i) \\
&= a_n \times (p_n + 1 - b_n) + B_{n-1}
\end{aligned}\right\} \quad (4)$$

(where $b_1 = B_1 = 0$)

As a result of the address space segmentation in accordance with the above relationships, the base address corresponding to each specific translation descriptor domain is defined as a common multiple of the translation step size of that domain and that of the immediately preceding domain located nearer to the top of the table. Accordingly, the beginning address of every translation descriptor domain will be a multiple of its translation step size, allowing the address translation table 40 to be packed with multiple translation descriptor domains without any gaps between them.

Referring back to FIG. 1, the operation of the proposed data transfer apparatus 10 will be described below. Suppose first that the user is to set up an address translation table 40. As stated in an earlier part, the address translation table storage unit 11 stores an address translation table 40. The structure of this table 40 is determined by the following parameters:

Base addresses Bn stored in the base address register 12

Boundary locations $b_n$ stored in the boundary location register 13

Translation step sizes $a_n$ stored in the translation step size register 14

The user can freely choose the values of translation step sizes $a_n$ and boundary locations $b_n$, in an attempt to optimize the address translation table 40 to efficiently handle every type of data to be transferred. When any of such translation step sizes an or boundary locations $b_n$ is changed, the translation descriptor domain manager 15 recalculates the base addresses $B_n$ in accordance with the equations (2) to (4). The changed $a_n$ and $b_n$ and recalculated $B_n$ are saved into the translation step size register 14, boundary location register 13, and base address register 12, respectively. The address translation table 40 is then reformed accordingly.

Figure 4:
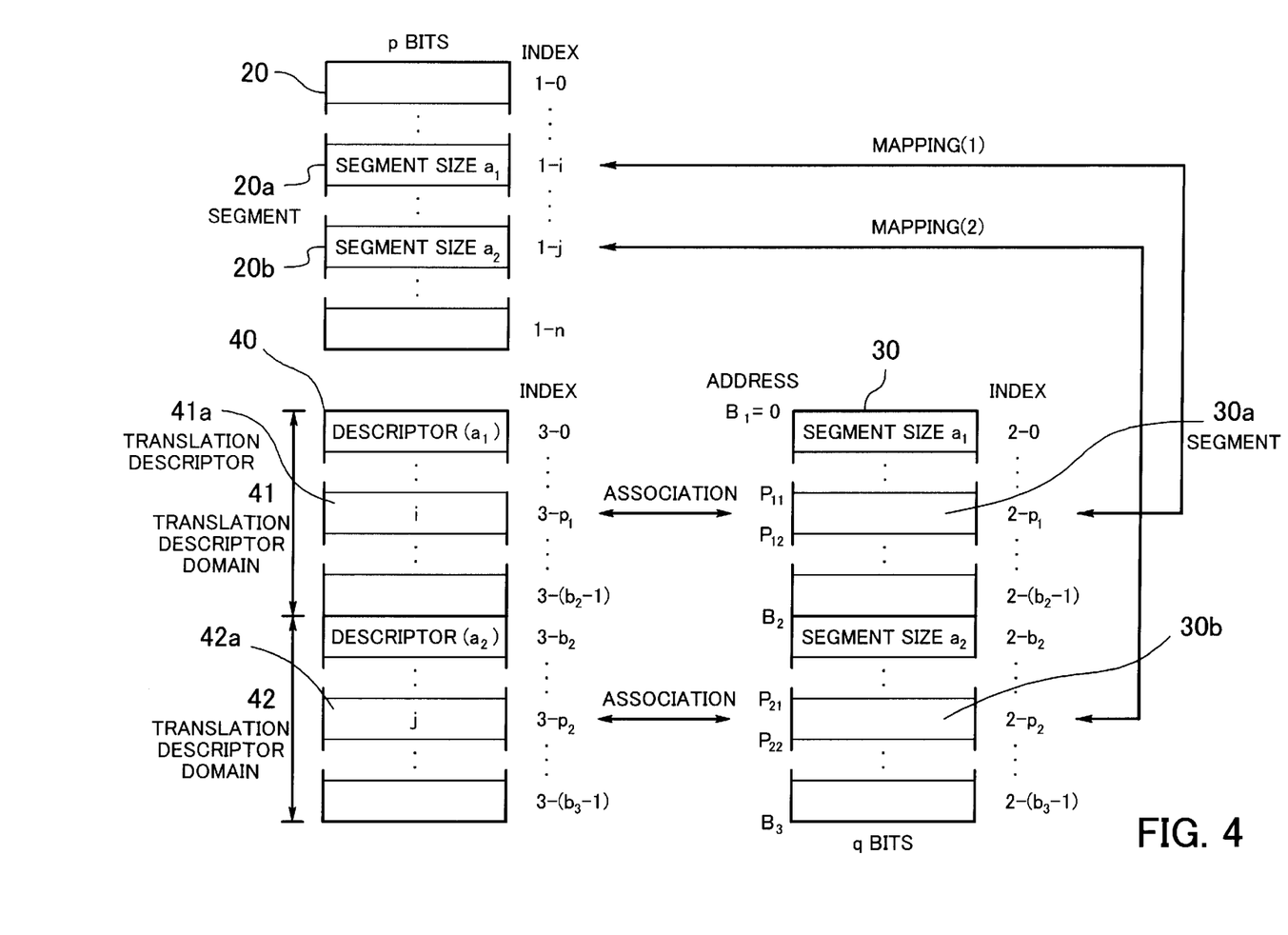
FIG. 4 is a diagram which shows how an address space for p-bit wide data is mapped to that for q-bit wide data.

The address translation table 40 formulated as above is used for mapping the segmented data areas as follows. FIG. 4 shows how an address space for p-bit wide data is mapped to that for q-bit wide data. In this example, the first address space 20 contains two types of data segments with different sizes $a_1$ and $a_2$. These segments are mapped to the second address space 30.

The mapping operation using the address translation table 40 is performed on the basis of individual data segments of the address space 20. When mapping data blocks with a specific segment size, $a_1$ or $a_2$, the translation descriptor domain selector 16 first chooses an appropriate translation descriptor domain provided in the address translation table 40, so that the data blocks can be handled efficiently. Take a segment 20a with a size of $a_1$, for example. To make a mapping for this segment 20a, the translation descriptor domain selector 16 chooses the first translation descriptor domain 41 with the translation step size of $a_1$.

Now that the relevant translation descriptor domain has been selected, the data segment association unit 17 now performs a segment mapping. More specifically, the data segment association unit 17 searches the selected translation descriptor domain to find a translation descriptor that contains the index number of a given segment of the address space 20. This descriptor corresponds to a particular segment in the address space 30, thus permitting the data segment association unit 17 to associate those two segments with each other.

Take a segment 20a shown in FIG. 4, for example. The address translation table 40 shows that a translation descriptor relevant to this segment 20a is located at the index position 3-$p_1$. This descriptor 41a corresponds to the segment 30a with an index number of 2-$p_1$ in the second address space 30, meaning that the segment 20a is mapped to the segment 30a, as indicated by the note "Mapping(1)" in FIG. 4.

When a data segment with a different size is encountered in the course of the segment mapping process, the translation descriptor domain selector 16 discards the current selection of translation descriptor domain and chooses another domain to suit the new segment size. The data segment association unit 17 continues mapping by using the reselected translation descriptor domain.

Suppose, for example, that a segment 20b with a size of $a_2$ has been encountered. This event causes the translation descriptor domain selector 16 to choose the second translation descriptor domain 42. The address translation table 40 shows that a translation descriptor relevant to the segment 20b is located at the index position 3-$p_2$. This descriptor 42a corresponds to the segment 30b with index 2-$p_2$ in the second address space 30, meaning that the segment 20b is mapped to the segment 30b, as indicated by the note "Mapping(2)" in FIG. 4. In this way, the proposed data transfer apparatus copes with various segment sizes by automatically changing the translation step size from one to another, consulting its local address translation table. This mechanism minimizes the frequency of necessary segment translations, thus making data transfer operations more efficient.

Figure 5:
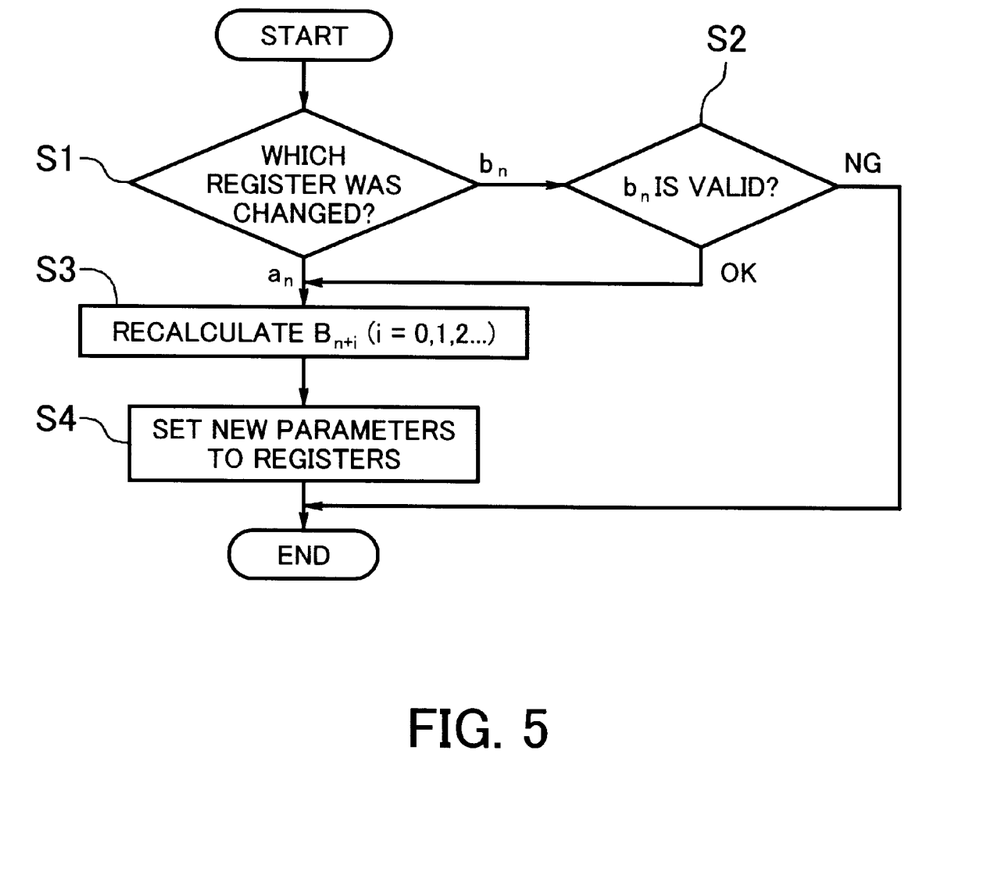
FIG. 5 is a flowchart of a base address re-calculation process executed when the translation step size or boundary location is changed.

The operation of the data transfer apparatus 10 will now be described with reference to the flowchart of FIG. 5. This flowchart represents a base address re-calculation process which is called up when translation step size or boundary location is changed.

(S1) It is determined which register value was changed, a translation step size an or a boundary location $b_n$. If it is a translation step size, the process proceeds to step S3. If it is a boundary location, the process advances to step S2.

(S2) The specified boundary location is validated. More specifically, it is tested whether the specified boundary location meets the requirements of the equations (2) and (3). If these equations hold, the process advances to step S3. If not, the process is terminated.

(S3) The base addresses are recalculated.

(S4) The new parameters are set to their respective registers (i.e., storage for translation step sizes, boundary locations, base addresses).

Figure 6:
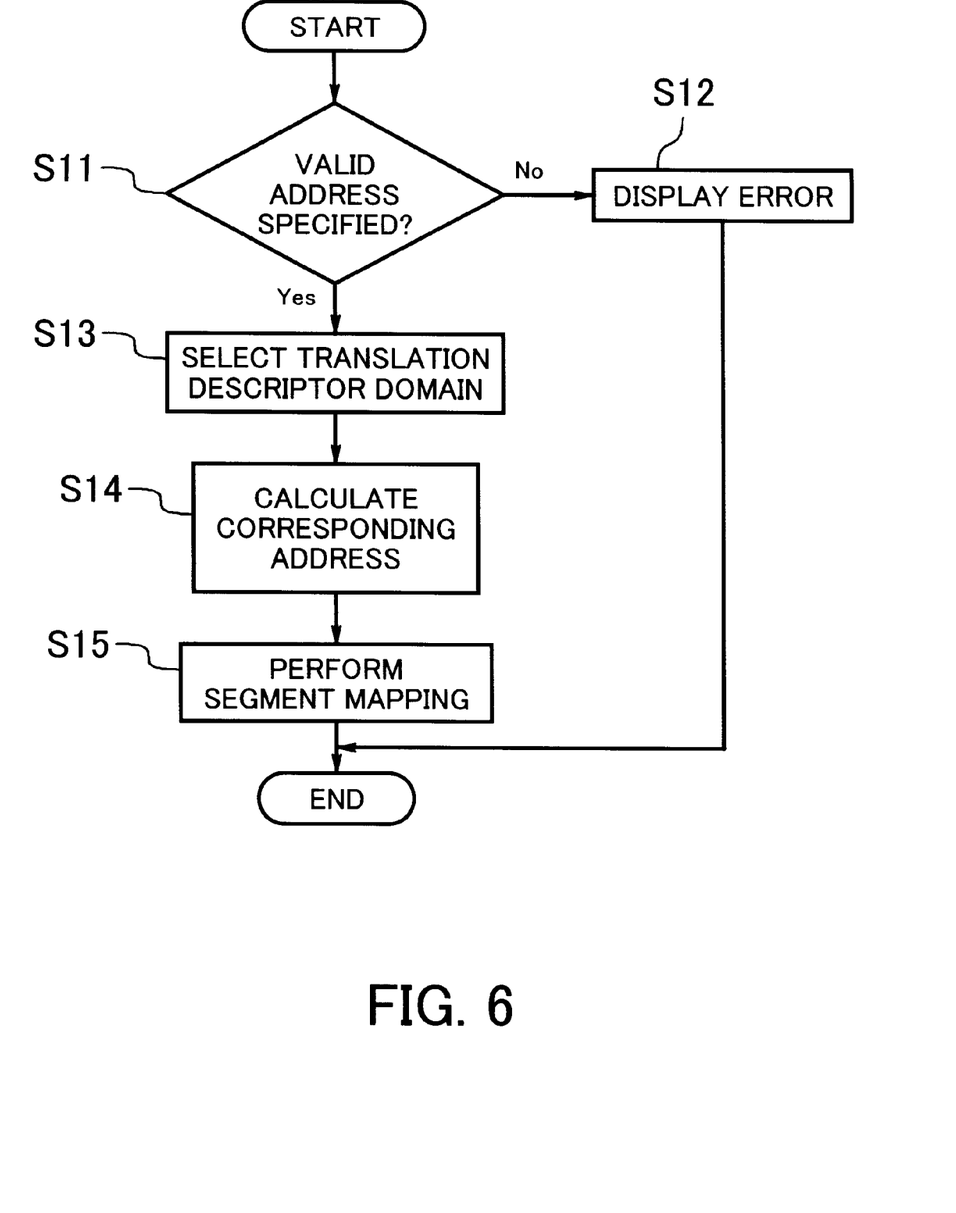
FIG. 6 is a flowchart of a mapping process.

Referring to the flowchart of FIG. 6, the proposed data transfer apparatus 10 makes a mapping as follows.

(S11) The data transfer apparatus 10 determines whether the address of the specified segment is a valid address within the address space 20. If it is valid, the process advances to step S13. If not, the process branches to step S12.

(S12) The apparatus 10 displays an error message.

(S13) The apparatus 10 selects an appropriate translation descriptor domain that is suitable for the specified segment.

(S14) Using the index number of the given segment of the address space 20, the apparatus 10 finds its relevant translation descriptor in the selected translation descriptor domain. This descriptor is associated with a particular segment in the address space 30. The data transfer apparatus 10 then calculates the address of that associated segment.

(S15) The apparatus 10 maps the given segment of the address space 20 to the target segment whose address has been calculated at step S14.

The next section will focus on the mapping operation by the data transfer apparatus 10, assuming some specific parameter setups. More specifically, consider that the address translation table 40 has three translation descriptor domains with the following different translation step sizes: $a_1$=16K, $a_2$=1M, and $a_3$=4M. Here, the symbols "K," "M," and "G" are used to represent decimal unit values 1024, $1024^2$, and $1024^3$, respectively. By substituting those step size values into the equations (2) to (4), the first boundary location $b_1$, first base address $B_1$, and $p_1$-th address $P_{11}$ are obtained as follows:

$$\left. \begin{array}{l} a_1 = 16\,\mathrm{K} \\ b_1 = 0 \\ B_1 = 0 \\ P_{11} = 16\,\mathrm{K} \times p_1\,(0 \leq p_1 \leq 127) \end{array} \right\} \quad (5)$$

Here, suppose that a value of 2M is chosen as a common multiple $d_2$ of $a_1$ and $a_2$. Then the multipliers $c_2$=128 and $c_2'$=2 are obtained.

$$16\mathrm{K} \times 128 = 1\mathrm{M} \times 2 = 2\mathrm{M}$$

$$(a_1 \times c_2' = a_2 \times c_2 = d_2)$$

The above parameters lead to the second boundary location $b_2$, second base address $B_2$, and $p_2$-th address $P_{21}$ as follows:

$$\left. \begin{array}{l} a_2 = 1\,\mathrm{M} \\ b_2 = c_2' = 128 \\ B_2 = a_1 \times b_2 = 16\,\mathrm{K} \times 128 = 2\,\mathrm{M} \\ P_{21} = 1\,\mathrm{M} \times (p_2 - 128) + 2\,\mathrm{M} \\ \quad = 1\,\mathrm{M} \times p2 - 126\,\mathrm{M}\,(128 \leq p_2 \leq 381) \end{array} \right\} \quad (6)$$

Further, a value of 256M is chosen as a common multiple $d_3$ of $a_2$ and $a_3$, and the multipliers $c_3$=64 and $c_3'$=256 are then obtained.

$$1\mathrm{M} \times 256 = 4\mathrm{M} \times 64 = 256\mathrm{M}$$

$$(a_2 \times c_3' = a_3 \times c_3 = d_3)$$

With the above parameters, the third boundary location $b_3$, third base address $B_3$, and $p_3$-th address $P_{31}$ are obtained as follows.

$$a_3 = 4\,\text{M}$$
$$b_3 = c'_3 + b_2 - c_2 = 256 + 128 - 2 = 382$$
$$B_3 = a_2 \times (b_3 - b_2) + B_2 = 256\,\text{M}$$
$$P_{31} = 4\,\text{M} \times (p_3 - 382) + 256\,\text{M}$$
$$= 4\,\text{M} \times p_3 - 1272\,\text{M}\,(382 \leq p_3 \leq 1341)$$

(7)

Here, the upper limit of index p3 is determined from the total size 4 G of the address space 30 as follows.

(4G−256M)/4M+382−1=1341

Table 3, shown below, summarizes the results of the above calculation. Note again that the total address space size is 4G, and the total number of translation descriptors is 1342.

TABLE 3

| Translation Descriptor domain | | #1 | #2 | #3 |
|---|---|---|---|---|
| Registers: | Translation Step Size | 16K | 1M | 4M |
| | Boundary location | 0 | 128 | 382 |
| | Base address | 0 | 2M | 256M |

Figure 7:
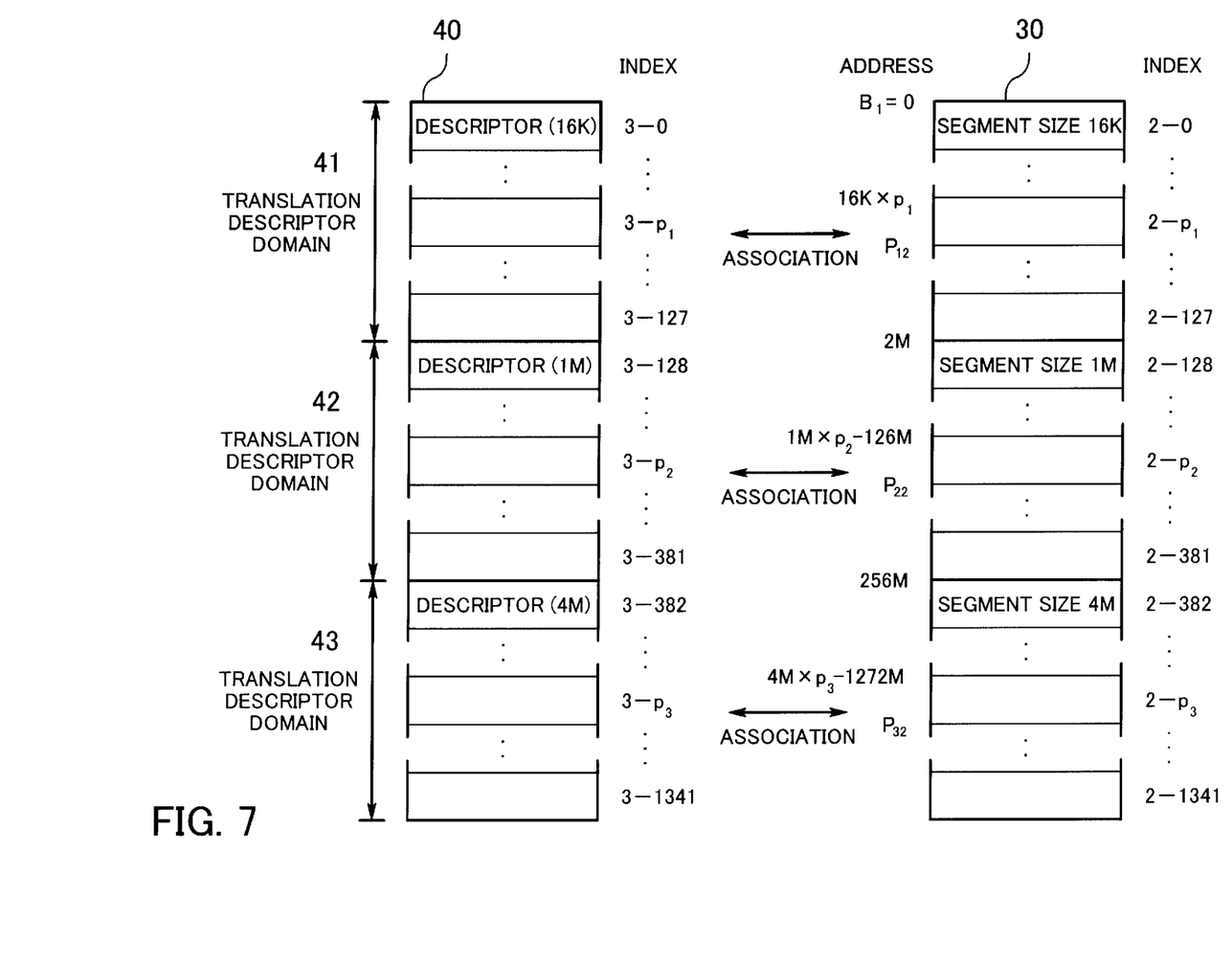
FIG. 7 is a diagram which shows an address translation table and its associated address space configured with some specific parameter values.

FIG. 7 shows the structure of the address translation table 40 configured in accordance with the parameters shown Table 3, as well as its associated address space 30. The first translation descriptor domain 41 comprises 128 translation descriptors numbered from 3-0 to 3-127, which are associated with the segments 2-0 to 2-127 in the address space 30. The second translation descriptor domain 42 comprises 254 translation descriptors numbered from 3-128 to 3-381, which are associated with the segments 2-128 to 2-381 in the address space 30. The third translation descriptor domain 43 comprises 960 translation descriptors numbered from 3-382 to 3-1341, which are associated with the segments 2-382 to 2-1341 in the address space 30.

Figure 8A:
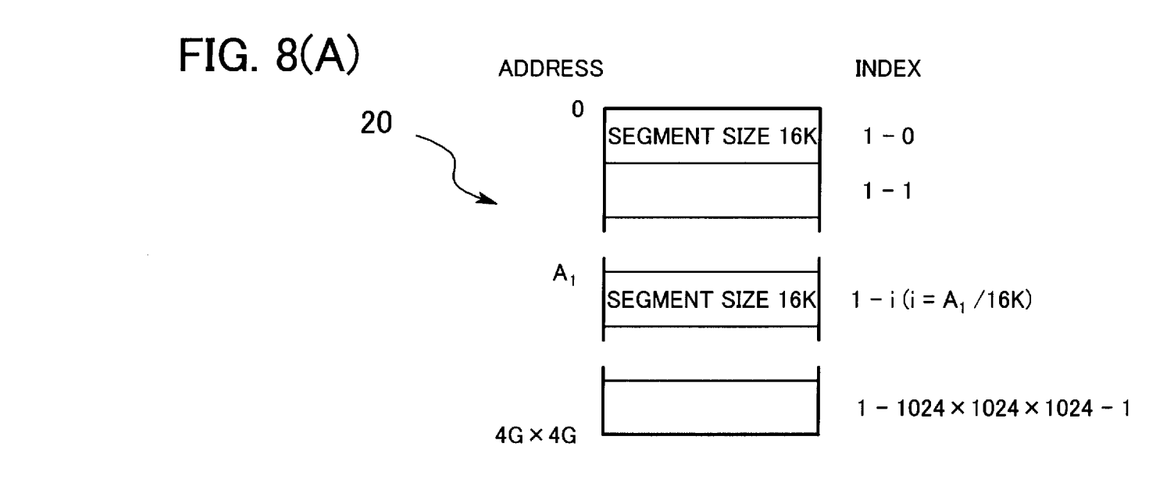
FIG. 8(A) is a diagram showing an address space with a segment size of 16K.
Figure 8B:
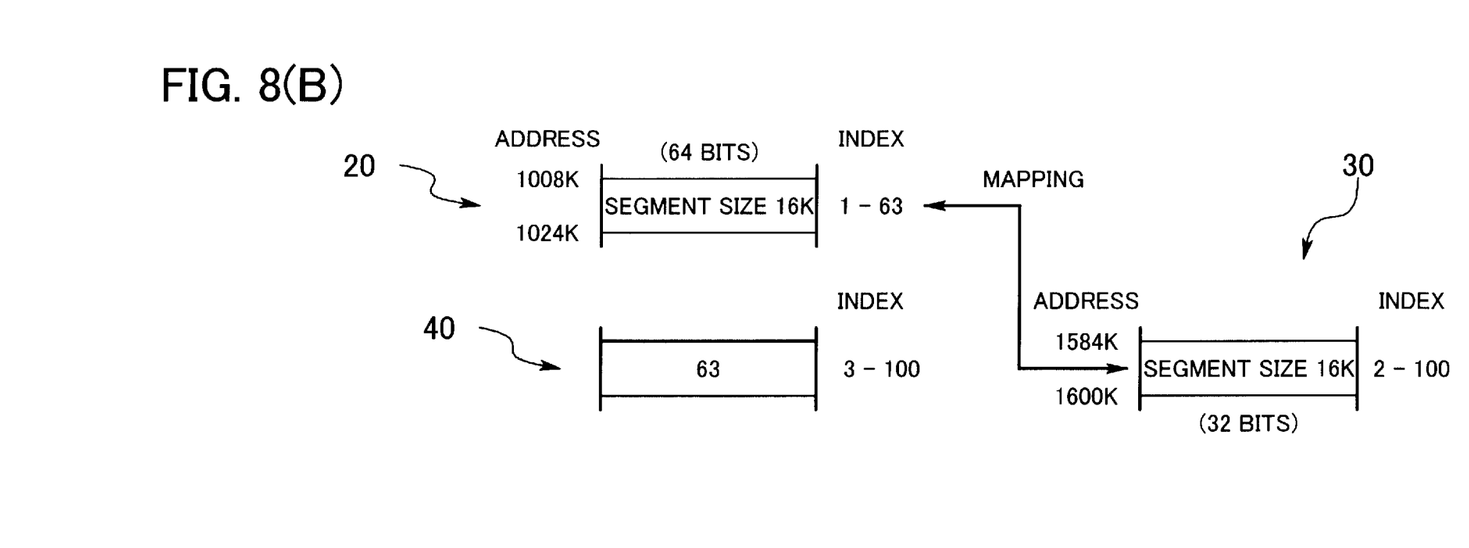
FIG. 8(B) is a diagram which shows how the segment of index "1-63" is mapped to the target space through the use of the address translation table shown in FIG. 7.

FIG. 8(A) illustrates the address space 20 with a segment size of 16K, and FIG. 8(B) shows how the segment of index 1-63 is mapped to another address space 30 through the use of the address translation table 40 shown in FIG. 7. In this example, the address space 20 is divided into segments each having a size of 16K. These 16K-long segments are index-numbered from "1-0" to "1-(1024×1024×1024−1)." Every data word in the address space 20 is 64 bits in length, which should be mapped to the other address space 30 with a word length of 32 bits.

FIG. 8(B) shows a specific case of the mapping operation. Here, the translation descriptor of index 3-100 in the address translation table 40 is associated with the segment 2-100 of the address space 30 which covers an address range between 1584K and 1600K. The descriptor 3-100 holds an index value "63," thereby associating the above segment 2-100 with a particular segment 1-63 in the address space 20 which covers an address range between 1008K and 1024K.

Figure 9A:
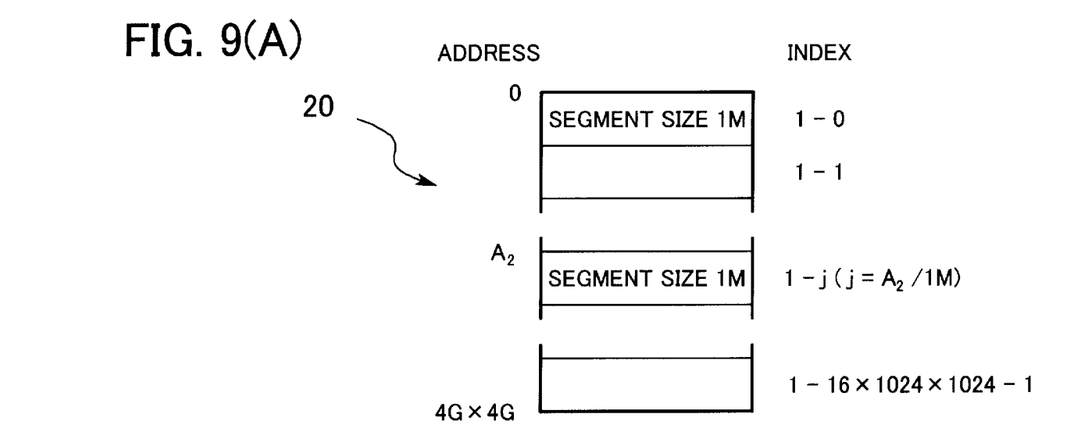
FIG. 9(A) is a diagram showing an address space with a segment size of 1M.
Figure 9B:
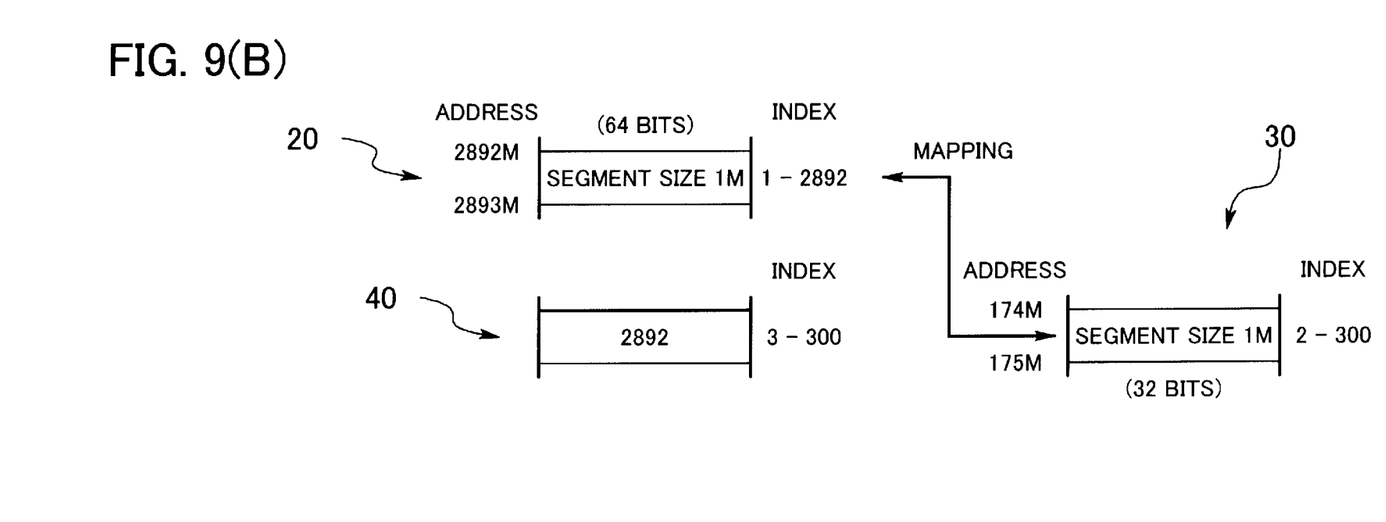
FIG. 9(B) shows how the segment of index "1-2892" is mapped to the target space through the use of the address translation table shown in FIG. 7.

FIG. 9(A) illustrates an address space 20 with a segment size of 1M, and FIG. 9(B) shows how the segment of index 1-2892 is mapped to another address space 30 through the use of the address translation table 40 shown in FIG. 7. In this example, the address space 20 is divided into segments each having a size of 1M. These 1M-long segments are index-numbered from "1-0" to "1-(16×1024×1024−1)." Every data word in the address space 20 is 64 bits in length, which should be mapped to the other address space 30 with a word length of 32 bits.

FIG. 9(B) shows a specific case of the mapping operation. Here, the translation descriptor of index 3-300 in the address translation table 40 is associated with the segment 2-300 of the address space 30 which covers an address range between 174M and 175M. The descriptor 3-300 holds an index value "2892," thereby associating the above segment 2-300 with a particular segment 1-2892 in the address space 20 which covers an address range between 2892K and 2893K.

Figure 10A:
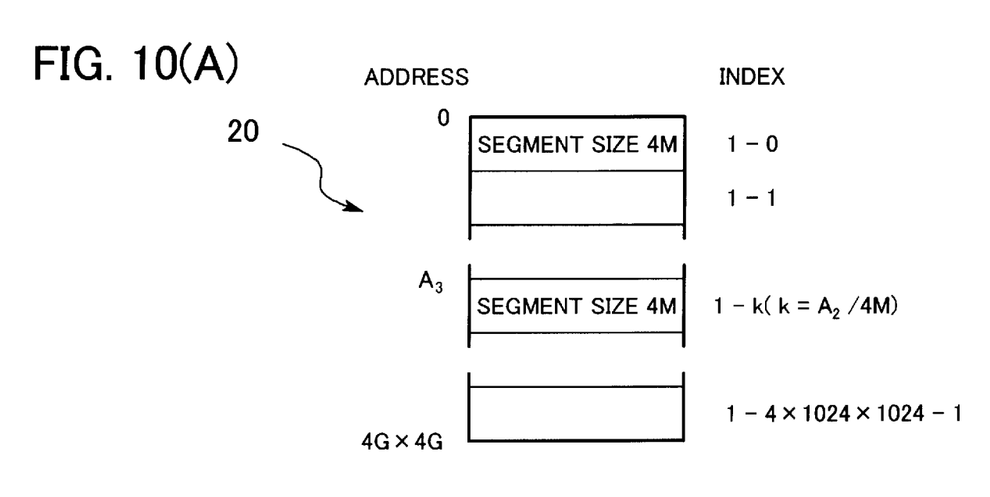
FIG. 10(A) is a diagram showing an address space with a segment size of 4M.
Figure 10B:
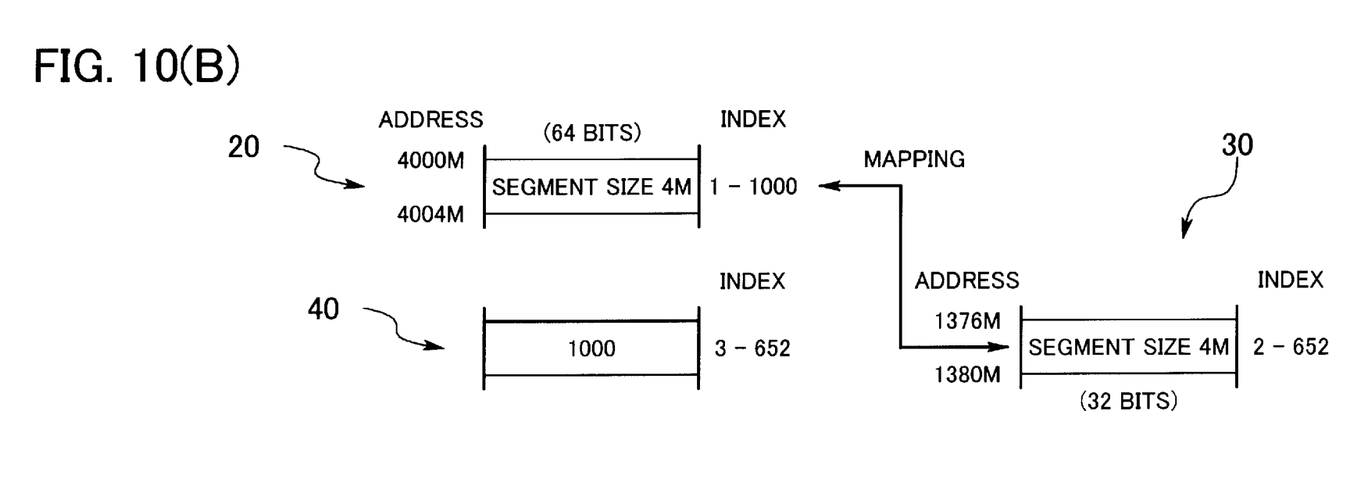
FIG. 10(B) shows how the segment of index "1-1000" is mapped to the target space through the use of the address translation table shown in FIG. 7.

FIG. 10(A) illustrates an address space 20 with a segment size of 4M, and FIG. 10(B) shows how the segment of index 1-1000 is mapped to another address space 30 through the use of the address translation table 40 shown in FIG. 7. In this example, the address space 20 is divided into segments each having a size of 4M. These 4M-long segments are index-numbered from "1-0" to "1-(4×1024×1024−1)." Every data word in the address space 20 is 64 bits in length, which should be mapped to the other address space 30 with a word length of 32 bits.

FIG. 10(B) shows a specific case of the mapping operation. Here, the translation descriptor of index 3-652 in the address translation table 40 is associated with the segment 2-652 of the address space 30 which covers an address range between 1376M and 1380M. The descriptor 3-652 holds an index value "1000," thereby associating the above segment 2-652 with a particular segment 1-1000 in the address space 20 which covers an address range between 4000M and 4004M.

As described above, the preferred embodiment of the present invention employs an address translation table 40 which provides a plurality of translation descriptor domains to support a plurality of translation step sizes to perform a segment mapping between two address spaces 20 and 30. The proposed apparatus 10 efficiently transfers various-sized data blocks, because its adaptive use of the translation step size that is suitable for the size of each data block to be transferred. Recall that conventional systems only allows, for example, a single translation step size of 16K even when they have to transfer such a data stream consisting of 16K, 1M, and 4M blocks. In contrast to this, the present invention enables the address translation table 40 to support all those different translation step sizes to optimize the process of segment mapping. Compared to the conventional 16K-only solution, the present invention reduces the number of mapping operations to $\frac{1}{64}$ in the case of 1M segments, or to $\frac{1}{256}$ in the case of 4M segments. This reduction will greatly contribute to the improvement of efficiency.

Further, according to the preferred embodiment, a plurality of translation descriptor domains are packaged in a single address translation table 40, instead of preparing a plurality of dedicated address translation tables for different translation step sizes. This arrangement of the address translation table 40 eliminates unused areas, thus permitting efficient use of memory resources.

The proposed processing mechanisms are actually implemented as software functions of a computer system. The process steps of the proposed data transfer system and method are encoded in a computer program, which will be stored in a computer-readable storage medium. The computer system executes this program to provide the intended functions of the present invention. Suitable computer-readable storage media include magnetic storage media and solid state memory devices. Other portable storage media, such as CD-ROMs and floppy disks, are particularly suitable for circulation purposes. Further, it will be possible to distribute the programs through an appropriate server computer deployed on a network. The program file delivered to a user is normally installed in his/her computer's hard drive or other local mass storage devices. The program will be executed after being loaded to the main memory.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data transfer apparatus which transfers data from a first address space to a second address space, the first and second address spaces being different in data structure, the apparatus comprising:

address translation table storage means for storing an address translation table which is organized by a plurality of translation descriptor domains to support a plurality of translation step sizes;

base address storage means for storing base addresses of a plurality of portions of the second address space which are corresponding to the plurality of translation descriptor domains;

boundary location storage means for storing boundary locations of the plurality of translation descriptor domains;

translation step size storage means for storing translation step sizes that are respectively supported in the plurality of translation descriptor domains;

translation descriptor domain selecting means for selecting one of the translation descriptor domains that is suitable for mapping a data segment in the first address space; and data segment associating means for associating the data segment in the first address space with another data segment in the second address space, according to the translation step size supported in the translation descriptor domain selected by said translation descriptor domain selecting means.

2. The data transfer apparatus according to claim 1, wherein the base address corresponding to each translation descriptor domain is a common multiple of the translation step size of said each translation descriptor domain and the translation step size of another translation descriptor domain that immediately precedes said each translation descriptor domain.

3. The data transfer apparatus according to claim 1, further comprising translation descriptor domain managing means for managing the plurality of translation descriptor domains by recalculating the base addresses when any one of the translation step sizes and boundary locations is changed.

4. A method of transferring data from a first address space to a second address space, the first and second address spaces being different in data structure, the method comprising the steps of:

storing an address translation table which is organized by a plurality of translation descriptor domains to support a plurality of translation step sizes;

storing base addresses of a plurality of portions of the second address space which are corresponding to the plurality of translation descriptor domains;

storing boundary locations of the plurality of translation descriptor domains;

storing translation step sizes that are respectively supported in the plurality of translation descriptor domains;

selecting one of the translation descriptor domains that is suitable for mapping a data segment in the first address space; and associating the data segment in the first address space with another data segment in the second address space, according to the translation step size supported in the selected translation descriptor domain.

5. A computer-readable medium storing a program which causes a computer system to execute the steps of:

storing an address translation table which is organized by a plurality of translation descriptor domains to support a plurality of translation step sizes;

storing base addresses of a plurality of portions of the second address space which are corresponding to the plurality of translation descriptor domains;

storing boundary locations of the plurality of translation descriptor domains;

storing translation step sizes that are respectively supported in the plurality of translation descriptor domains;

selecting one of the translation descriptor domains that is suitable for mapping a data segment in the first address space; and associating the data segment in the first address space with another data segment in the second address space, according to the translation step size supported in the selected translation descriptor domain.

* * * * *